Jan. 5, 1954

G. L. TURNER 2,664,843

SUPPORTING MECHANISM FOR ROTATING
AXLE HOUSINGS FOR WELDING

Filed Sept. 9, 1949

INVENTOR.
GEORGE L. TURNER

BY Walter E. Schirmer

ATTY.

Jan. 5, 1954

G. L. TURNER 2,664,843

SUPPORTING MECHANISM FOR ROTATING
AXLE HOUSINGS FOR WELDING

Filed Sept. 9, 1949

INVENTOR.
GEORGE L. TURNER
BY Walter E. Schirmer
ATTY.

Jan. 5, 1954

G. L. TURNER 2,664,843

SUPPORTING MECHANISM FOR ROTATING
AXLE HOUSINGS FOR WELDING

Filed Sept. 9, 1949

INVENTOR.
GEORGE L. TURNER
BY
Walter E. Schirmer
ATTY.

Patented Jan. 5, 1954

2,664,843

UNITED STATES PATENT OFFICE 2,664,843

SUPPORTING MECHANISM FOR ROTATING AXLE HOUSINGS FOR WELDING

George L. Turner, Buchanan, Mich., assignor to Clark Equipment Company, Buchanan, Mich., a corporation of Michigan Application September 9, 1949, Serial No. 114,774

2 Claims. (Cl. 113—59)

1

This invention relates to means for reinforcing banjo type axle housings and, more particularly, is directed to a mechanism for supporting an axle housing for rotation about the center of the banjo portion thereof, and automatically welding reinforcing rings to the opposed faces of the housing. The present invention is considered as an improvement upon that disclosed in Spatta #2,194,101, issued March 19, 1940, and contemplates as one of its primary objects, a mechanism whereby both rings may be simultaneously welded to the housing at the same time, the welding heads remaining stationary while the housing is rotated therebeneath with the rings clamped in fixed position.

Preferably, a submerged arc type of weld is employed for this purpose, although this is not a part of the present invention, as any type of welding mechanism might be so used.

The principal object of the present invention is to provide means whereby melt retaining rings, the two reinforcing rings, and the banjo portion of the housing may be securely clamped in position about a rotatable head, so that as the two welding heads are moved into position and the welding operation initiated, the rotatable head can be actuated to move successive circumferential portions of both of the rings simultaneously beneath the welding heads to effect a complete circumferential weld between the banjo flange and the outer periphery of the reinforcing rings. The melt retaining rings are employed for the purpose of building up a sufficient quantity of melt or flux to keep the arc submerged and prevent burning.

Another object of the present invention is to provide a rotatable head of this type for supporting an axle housing for rotation about its banjo, which head has clamping mechanism thereon for internally clamping the housing about the inner periphery of the banjo flanges thereof, and for externally clamping reinforcing rings against the side faces of the banjo flanges.

A still further object of the present invention is to provide a rotatable head of this type which is adjustable to accommodate itself to various size housings without requiring dismantling or removal of the head, but whereby the head itself is also so disposed that it can be completely removed for repair or maintenance.

Other objects and advantages of the present invention, including simplicity of operation and control will be more apparent from the following detailed description which, taken in conjunction with the accompanying drawings, will

2 disclose to those skilled in the art a preferred form of the present invention.

In the drawings, Figure 1 is a front elevational view of a welding stand embodying the present invention;

Figure 1:
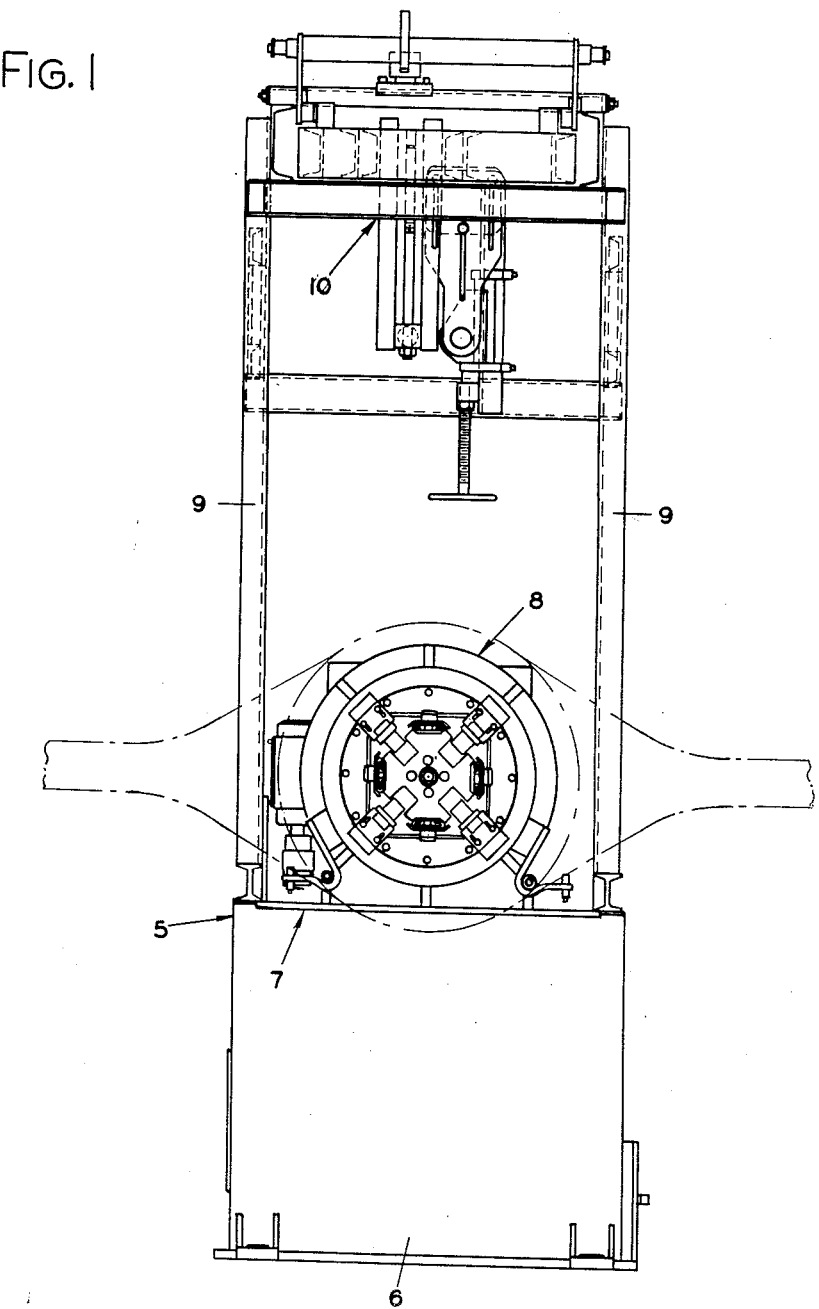
Figure 2:
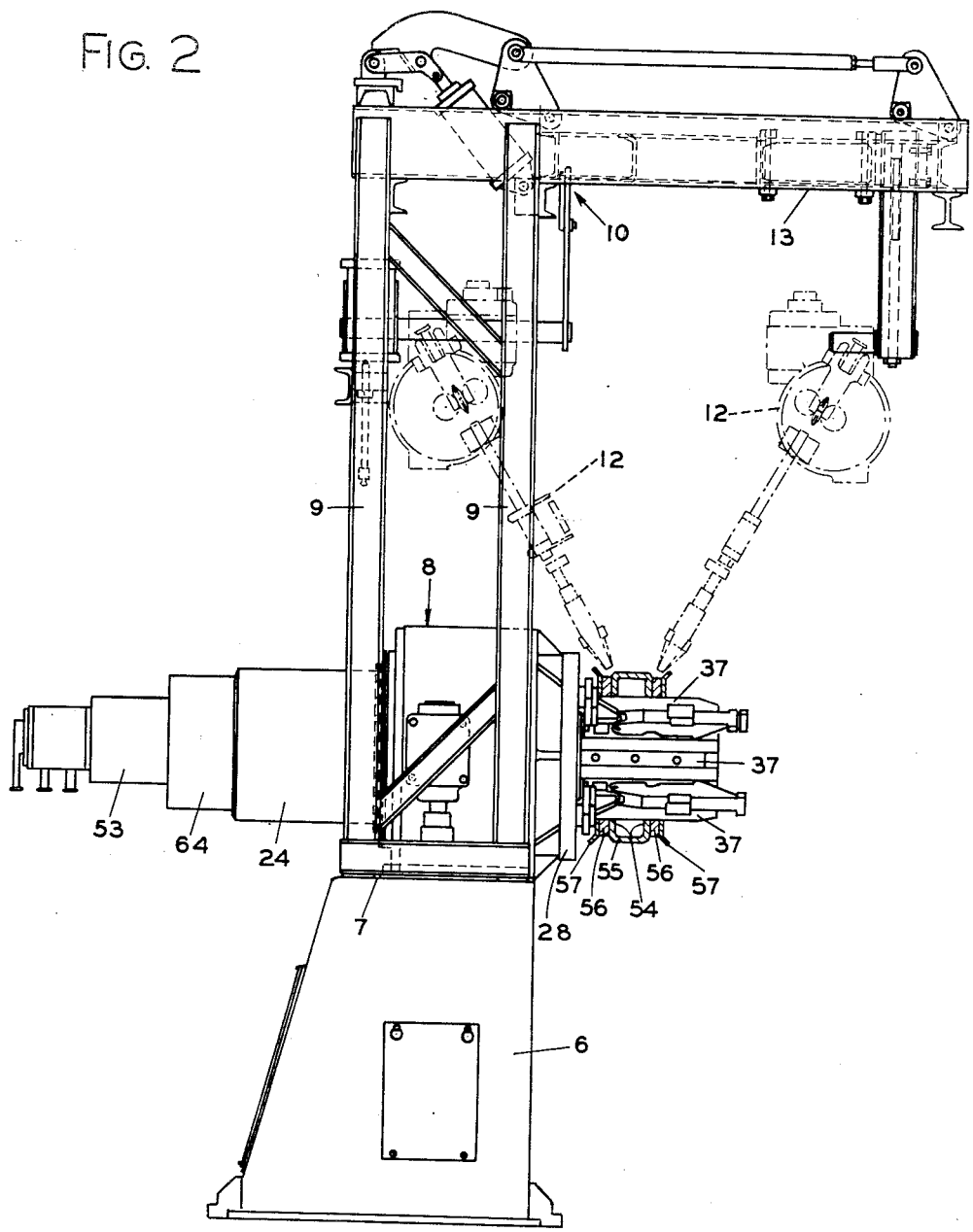
Figure 2 is a side elevational view of the stand shown in Figure 1, with the axle housing shown diagrammatically in section.

Referring now in detail to the drawings, in Figure 1 the welding stand is indicated generally at 5 and comprises a base portion 6, suitably anchored or otherwise secured upon a foundation, a bed portion 7 upon which the housing supporting head, generally indicated at 8, is located, and vertically extending supporting channels 9 forming an overhead support mechanism, indicated generally at 10, for the two welding heads which are shown diagrammatically at 12 in Figure 2.

It will be noted that the overhanging stand 10 has a forward projection 13 for supporting the forward welding head 12 and that suitable adjustable means is provided for varying the space between the two welding heads, as well as their relative heights, to accommodate the use of these two heads 12 to various sizes and widths of housings upon which the reinforcing rings are to be welded.

Figure 3:
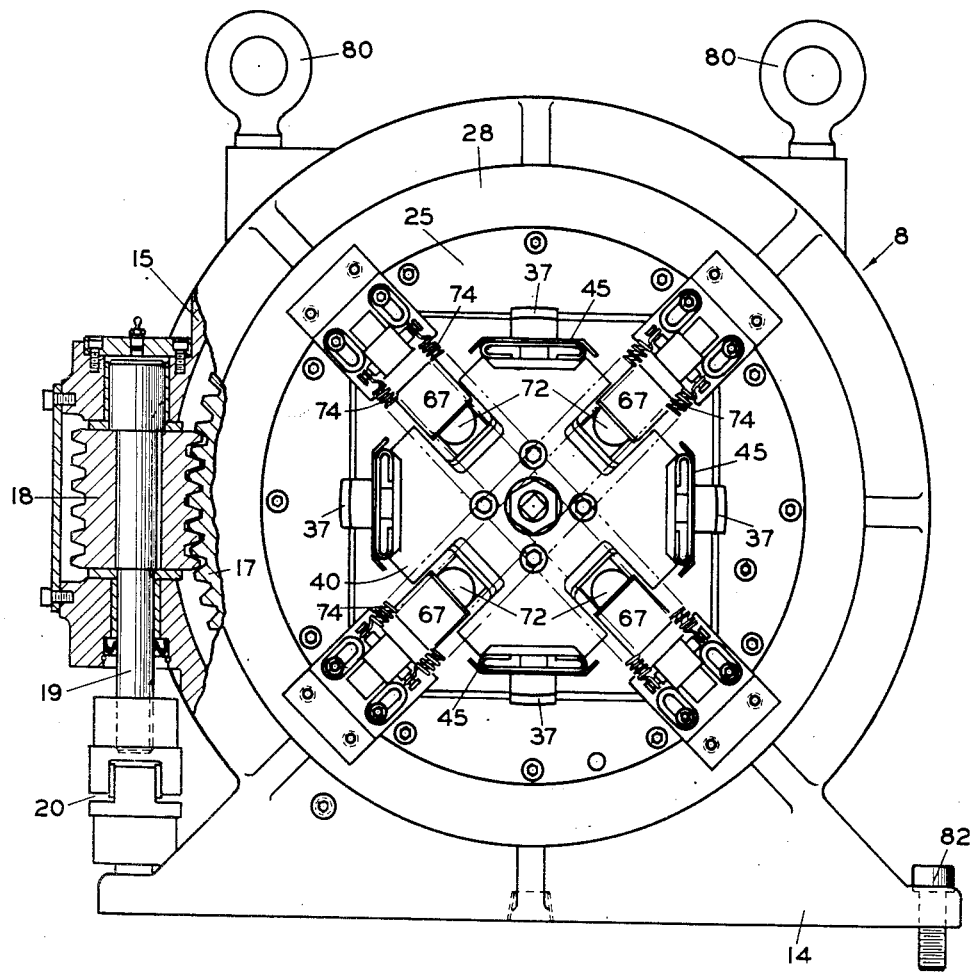
Figure 3 is an end elevational view, partly in section, of the rotating head and clamping mechanism for the banjo of the axle housing.

Mounted upon the bed 7, as by means of foot portions 14 shown in Figure 3, is the rotating and clamping mechanism 8 which consists of a central housing portion 15 rigidly secured to the bed 7 of the stand, and having journaled therein a rotating drum member 16, provided with the annular worm gear 17 which, at one side thereof, is adapted to be driven by the worm pinion 18 carried on the shaft 19, this shaft being driven through the coupling 20 from a motor disposed in the base 6 of the welding stand. The reduction gearing is so arranged as to rotate the drum member 16 slowly upon the bushings 22 by which it is journaled within the stationary housing 15.

Figure 4:
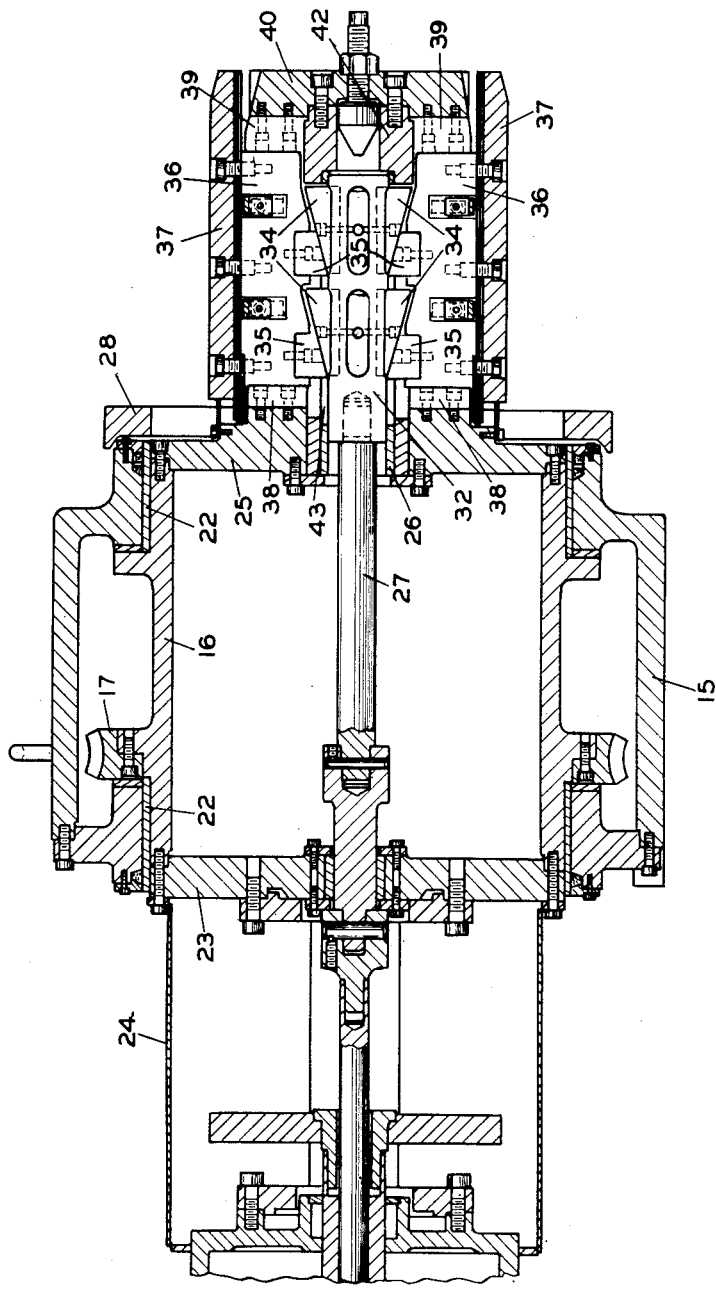
Figure 4 is a transverse sectional view through a portion of the rotating head, showing the radially expanding clamp mechanism.

The drum 16 is closed at one end by the radial plate member 23, which is bolted thereto and which carries the cylindrical sleeve 24 forming a second cylindrical enclosure extending rearwardly from the drum 16. The opposite end of the drum is enclosed by a plate 25 having a central aperture receiving a bushing 26 for supporting a shaft 27 which extends axially through the drum. The plate member 25, as may be seen from a comparison of Figures 4 and 5, is relieved at certain points and carries on its annular periphery the backing plate or wear plate 28, forming an enclosure for one of the bushings 22 at the forward end of the drum.

Bolted to the forward face of the plate 25 is a flange member or ring 29, forming a support for a forwardly projecting frusto-conical ring 30 which serves as the inner abutment for the housing and reinforcing rings when positioned on the head, as will be described in detail hereinafter.

Figure 5:
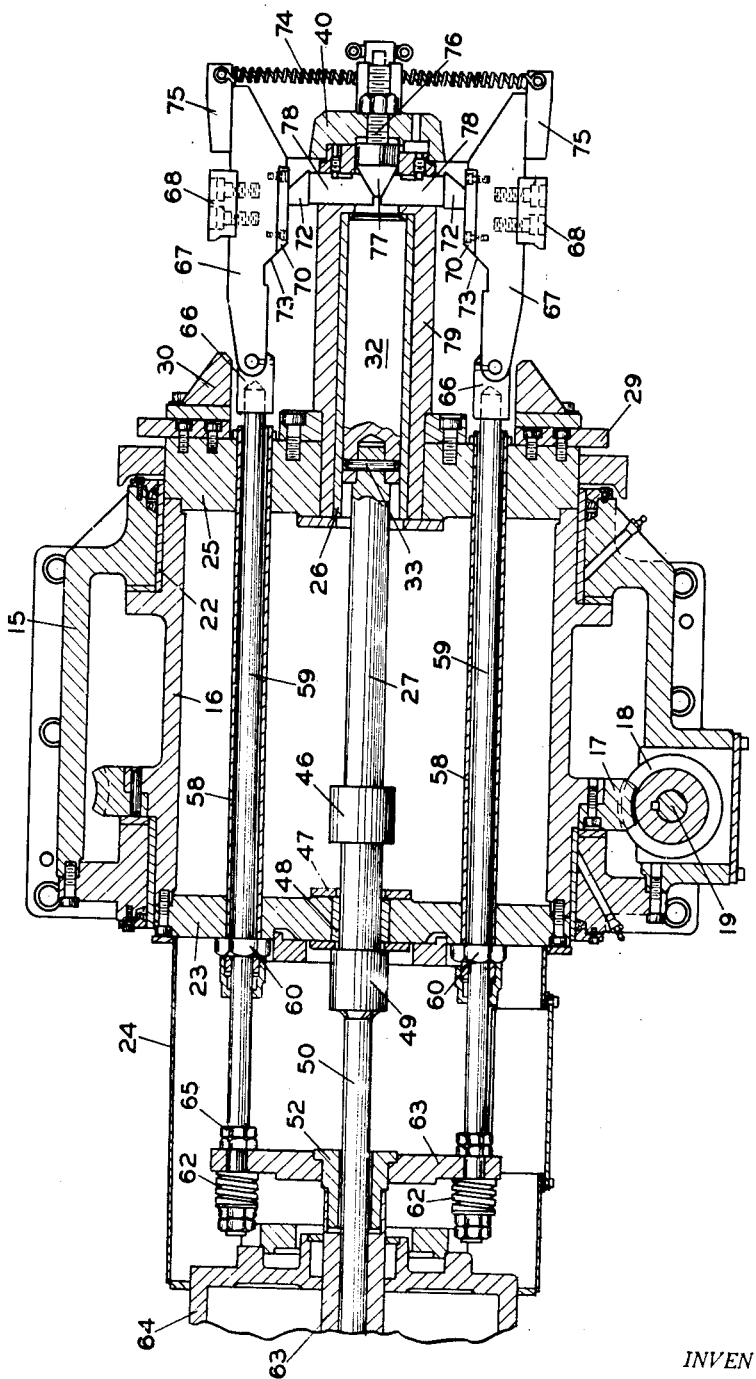
Figure 5 is a corresponding sectional view illustrating the clamping mechanism.

The bushing 26, as will be seen more clearly from Figure 5, comprises an extending sleeve forming a telescopic guide for a cam actuating member 32, connected to the end of the shaft 27 by means of the pin 33, so as to move conjointly with this shaft. The plunger 32, as seen more clearly in Figure 4, has mounted thereon cam elements 34 which are adapted to engage with cam members 35 carried on the base portions 36 of radially expandable shoe members 37, there being four of such members spaced circumferentially about the forward extending end of the drum whereby, when the rod 27 is moved to the left, as viewed in Figure 4, the camming action of the members 34 against the cams 35 causes these shoe members to be raised or forced radially outwardly into clamping engagement with the inner periphery of the flanges of the banjo portion of the axle housing. The shoe members are confined against relative axial movement by means of the wear plates 38 and 39, the wear plates 38 being carried on the face of the closure member 25, and the wear plates 39 being carried upon an end plate 40 which, in turn, is secured to the cylindrical member 42 which, at its inner end, receives the outer end of the bushing 26, the bushing being slotted, as indicated at 43, to provide room for the cam member 34 and cams 35 to operate.

A certain amount of adjustability is provided in the shoes 37 by reason of the adjustable screws by which these shoes are carried upon the base member 36, and the cams are also adjustable so that the radial movement of the shoes can be varied to accommodate different sized housings for the welding operation.

Preferably, the shoes 37, as shown in Figure 3, are provided with deflector strips 45 for preventing any weld metal which might drop through from interfering with the action of the cam members. The rod 27, within the drum 16, is provided with a collar portion 46 which limits its movement to the left by abutment against the thrust plate 47 surrounding the opening through which the rod extends and within which is disposed the bushing 48. Movement in the opposite direction is controlled by the collar 49 on the shaft 47, the shaft being reduced as indicated at 50 therebeyond, and extending through the bushing 52 into the remote cylinder end 53 where it terminates in a piston head (not shown), whereby hydraulic pressure can be employed for moving the rod forwardly or rearwardly to expand or contract the radial shoes 37.

As will be seen in Figure 2, the radial shoes 37, when in expanded position, form a centering means for the inner periphery of the flanges 54 of the banjo portion 55 of the axle housing, and also form a centering means for reinforcing rings 56 and the flux retaining rings 57 which are clamped on the outer faces of each of the rings 56.

Also extending through the drum 16 are a plurality of circumferentially spaced sleeve members 58, supported in the end plates 23 and 25 and having therein rods or bars 59 which are adapted to receive nuts 60, forming stops for limiting the movement of the rods in one direction. The nuts are not secured to the rods, however, and the rods may ride therethrough being connected at their ends through the springs 62 to a cross-head 63 which carries the bushing 52.

The bushing 52 has centered thereon a piston rod portion 63 extending into the cylinder 64, forming an enclosure for the cylindrical extensions 24 and including a piston operating within the cylinder 64 for moving the cross-head axially to impart axial movement to the rods 59. The adjusting nuts 65, carried by and locking the rods to the cross plate 63, limit the motion of the rods when they come into abutment with the abutment stops carried by the nuts 62.

At the ends of the rods which project forwardly from the end plate 25, suitable clevis connections are provided, as indicated at 66, to clamping bars 67, these clamping bars carrying clamps 68 mounted thereon, which clamps 68 are adapted to engage the outer face of the outer melt retaining ring 57, as shown in Figure 2, for exerting axial clamping pressure from this outer ring through the reinforcing ring and faces of the base housing portion against the abutment plate 29 carried by the end plate 25.

In Figure 5, the clamps 68 are shown in actuated position with the rods 59 drawn inwardly to the left and the piston moved to its innermost position. Upon reverse movement of the piston and cross-head 63, the rods are positioned forwardly, whereupon the wear plates 70 of the clamping members 67 ride over the cams 72 and, when the cam surfaces 73 of the clamp plates are sufficiently projected, will engage the cam surfaces of the cam 72 allowing the clamps 68 to be retracted radially inwardly, this retraction accomplished by a plurality of springs 74 crossconnected between the clamp plates as shown in Figure 3, and secured to lugs 75 carried on the outer ends of the clamp members 67.

The pivotal connections between the clevis 66 and the clamp member 67 allow for this retraction, the members 67 being disposed in alternate spaced relation with respect to the shoes 37, and being sufficiently retracted within the circumferential opening through the banjo portion of the housing to allow the housing to be removed therepast.

To secure adjustment of the clamps 68 for various sized housings, the end member 40, as described in connection with Figure 4, is adapted to carry an adjusting screw 76, which has a conical end 77 engaging radially movable adjusting members 78, upon which the cams 72 are carried. By screwing the adjusting screws 76 inwardly, the cams 72 are expanded radially, thereby raising the clamps 68 to take a larger size axle housing.

Suitable individual set screws control the adjusting movement of the members 78 which are slidably mounted in the sleeve portion 79 surrounding the bushing 26 and carried by the end plate 25.

It is therefore apparent that with this type of clamping head mounted for rotation as described, an axle housing can be supported on the outer end thereof, with the two reinforcing rings and melt retaining rings clamped against opposite faces of the banjo flanges and, as the housing is rotated, the welding heads 12 will deposit weld material through the melt for rigidly securing the reinforcing rings 56 to the faces of the banjo flanges.

Upon completion of the welding operation, the pistons in the cylinders 53 and 64 are reversed in motion, causing the clamp members 68 to be moved axially outwardly and then retracted radially inwardly, while the shoes 37 are retracted radially inwardly by forward movement of the cam carrying plunger 32. This insures that both rings will be centered with respect to the opening in the banjo portion of the housing and will be welded simultaneously thereto, the rings 57 being solely for the purpose of supporting sufficient flux material to keep the arc submerged.

In the case of welding other than by submerged arc, the rings 57 could be eliminated or utilized solely for preventing any splashing of weld material onto the clamping mechanism.

It is believed apparent that this provides a fixed type of mounting for the axle housing to insure it being fixed in position during the welding operation and yet allow its free rotation to accomplish the automatic, simultaneous welding of the two rings. It will be noted that the housing 15 is provided with a pair of eyes 80, as shown in Figure 3, so that if the bolts, such as indicated at 82, are removed, loosening the housing from the bed 7, the entire rotating head mechanism and hydraulic cylinder can be removed as a unit for maintenance and repair.

I am aware that various changes may be made in certain details of the present construction without in any way departing from the underlying features of my invention, and I therefore do not intend to be limited except as defined by the scope and spirit of the appended claims.

I claim:

1. Means for supporting and clamping reinforcing rings to the side faces of the banjo portion of an axle housing comprising a fixed housing, a drum rotatably journaled therein and including a forward extension, a set of radially movable circumferentially spaced and axially extending shoes carried by said forward extension, guide means carried by said extension at the ends of said shoes to restrain axial movement of said shoes, an axially shiftable rod, cam means between the one end of said rod and said shoes whereby upon axial movement of said rod said shoes are moved radially outwardly into engagement with the inner peripheral portions of the rings and banjo portion to center the same, hydraulic piston and cylinder assembly means for effecting selective axial movement of said rod, a set of clamp members arranged intermediate of said shoes, a plurality of axially shiftable bars with one being secured to each clamp member, cam means between the forward extension and the clamp members whereby upon axial movement of said bars said clamp members are moved radially outwardly beyond said shoes and axially toward said drum member so that the rings and banjo portion may be clamped between said drum member and said clamp members, and hydraulic piston and cylinder means for effecting selective axial movement of said bars.

2. Means for supporting and clamping reinforcing rings to the side faces of the banjo portion of an axle housing comprising a fixed housing, a drum rotatably journaled therein and including a forward extension, a set of radially movable circumferentially spaced and axially extending shoes carried by said forward extension, guide means carried by said extension at the ends of said shoes to restrain axial movement of shoes, inclined cam elements secured to each shoe, an axially shiftable rod extending through said drum and into said extension, inclined cam elements secured to the end of said rod within said extension for cooperation with the cam elements of said shoes whereby upon axial movement of said rod said shoes are moved radially outwardly into engagement with the inner peripheral portions of the rings and banjo portion to center the same, a set of clamp members arranged intermediate of said shoes, a plurality of axially shiftable bars extending through said drum and into said extension with one being secured to each clamp member, inclined cam elements secured to said forward extension, inclined cam elements secured to each clamp member for cooperation with the cam elements of said forward extension whereby upon axial movement of said bars said clamp members are moved radially outwardly until the inclined elements of the clamp members clear the inclined cam elements of said forward extension and then axially toward said drum member so that the rings and banjo portion may be clamped between said drum member and said clamp members, a crosshead interconnecting said bars, first hydraulic piston and cylinder means for effecting selective axial movement of said rod, and second hydraulic piston and cylinder means for effecting selective axial movement of said cross-head.

GEORGE L. TURNER.

References Cited in the file of this patent

UNITED STATES PATENTS

| Number | Name | Date |
|---|---|---|
| 1,550,651 | Charter | Aug. 18, 1925 |
| 2,091,307 | Catlett | Aug. 31, 1937 |
| 2,107,093 | Terrell | Feb. 1, 1938 |
| 2,167,338 | Murcell | July 25, 1939 |
| 2,194,101 | Spatta | Mar. 19, 1940 |
| 2,272,698 | Garrett | Feb. 10, 1942 |
| 2,334,606 | Castiglia | Nov. 16, 1943 |
| 2,353,868 | Bixbee | July 18, 1944 |
| 2,525,680 | Ingermarson | Oct. 10, 1950 |
| 2,615,413 | Adams et al. | Oct. 28, 1952 |